United States Patent [19]

Stewart et al.

[11] Patent Number: 5,634,033
[45] Date of Patent: May 27, 1997

[54] DISK ARRAY STORAGE SYSTEM ARCHITECTURE FOR PARITY OPERATIONS SIMULTANEOUS WITH OTHER DATA OPERATIONS

[75] Inventors: John W. Stewart; Dennis E. Gates; Rodney A. DeKoning; Curtis W. Rink, all of Wichita, Kans.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 357,847

[22] Filed: Dec. 16, 1994

[51] Int. Cl.⁶ .............................. G06F 13/00; G06F 11/00
[52] U.S. Cl. .................... 395/441; 364/DIG. 1; 364/DIG. 2; 371/49.1; 371/49.2; 395/182.04; 395/439
[58] Field of Search ..................... 395/404, 405, 395/439, 440, 441, 182.03, 182.04; 364/DIG. 1, DIG. 2, 236.2, 266.3; 371/49.1, 49.2, 40.4

[56] References Cited

U.S. PATENT DOCUMENTS

| | | | |
|---|---|---|---|
| 5,191,584 | 3/1993 | Anderson | 395/441 |
| 5,206,943 | 4/1993 | Callison et al. | 395/441 |
| 5,218,689 | 6/1993 | Hotle | 395/441 |
| 5,257,391 | 10/1993 | Dulac et al. | 395/800 |
| 5,263,145 | 11/1993 | Braddy et al. | 395/441 |
| 5,345,565 | 9/1994 | Tibble et al. | 395/325 |
| 5,375,217 | 12/1994 | Jibbe et al. | 395/441 |
| 5,392,244 | 2/1995 | Jacobson et al. | 395/441 |
| 5,398,253 | 3/1995 | Gordon | 395/441 |
| 5,418,925 | 5/1995 | DeMoss et al. | 395/441 |
| 5,469,566 | 11/1995 | Hohenstein et al. | 395/182.04 |

*Primary Examiner*—Tod R. Swann
*Assistant Examiner*—Tuan V. Thai
*Attorney, Agent, or Firm*—Daniel N. Fishman; James M. Stover; Wayne P. Bailey

[57] ABSTRACT

A high performance scaleable hardware architecture for a disk array storage subsystem which supports RAID modes 0, 3, 4 and 5. The architecture features a high bandwidth parity calculation engine, a buffered PCI interface operating at the full speed of the PCI bus, and a dedicated local memory. The dedicated local memory is dual ported so that PCI and parity operations may operate concurrently. The architecture of the disk array controller allows parity calculations and memory block moves to occur without interfering with the controller processor or its associated memory, freeing the controller processor to manage array task control. The array controller configuration allows simultaneous operation of data block moves between storage I/O devices and local memory; data block moves between host SCSI connections and local memory; parity calculations; and normal CPU memory fetches, queued operations for block moves and queued operations for parity tasks.

9 Claims, 2 Drawing Sheets

DISK ARRAY STORAGE SYSTEM ARCHITECTURE FOR PARITY OPERATIONS SIMULTANEOUS WITH OTHER DATA OPERATIONS

The present invention relates to disk array storage systems and, more particularly, to a hardware disk array controller providing improved performance, and the execution of concurrent data movements and parity calculations.

BACKGROUND OF THE INVENTION

A Redundant Array of Inexpensive Disks, referred to as a RAID storage system, is a collection of disk drives which appears as a single large disk drive to a host computer system. Additionally, part of the disk storage capacity is utilized to store redundant information about user data stored on the remainder of the storage capacity. This redundant information allows the disk array to continue to function without the loss of data should an array disk drive member fail, and permits the regeneration of data to a replacement array disk drive member.

Several RAID disk array design alternatives were presented in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks.

Five disk array arrangements are described in the article. The first level RAID comprises N disks for storing data and N additional "mirror" disks for storing copies of the information written to the data disks. RAID level 1 write functions require that data be written to two disks, the second "mirror" disk receiving redundant information, i.e., the same information provided to the first disk. When data is read, it can be read from either disk.

RAID level 3 systems comprise one or more groups of N+1 disks. Within each group, N disks are used to store data, and the additional disk is utilized to store redundant information, i.e., parity information. During RAID level 3 write functions, each block of data is divided into N portions for storage among the N data disks. The corresponding parity information is calculated by determining the exclusive-OR product of the data written to the N data disks and written to a dedicated parity disk. When data is read, all N data disks must be accessed. The parity disk is used to reconstruct information in the event of a disk failure.

A RAID level 2 system is similar to the RAID level 3 systems described above, but includes additional redundant disks for identifying disk drive failures.

RAID level 4 systems are also comprised of one or more groups of N+1 disks wherein N disks are used to store data, and the additional disk is utilized to store parity information. RAID level 4 systems differ from RAID level 3 systems in that data to be saved is divided into larger portions, consisting of one or many blocks of data, for storage among the disks. Writes still require access to two disks, i.e., one of the N data disks and the parity disk. In a similar fashion, read operations typically need only access a single one of the N data disks, unless the data to be read exceeds the block length stored on each disk. As with RAID level 3 systems, the parity disk is used to reconstruct information in the event of a disk failure.

RAID level 5 is similar to RAID level 4 except that parity information, in addition to the data, is distributed across the N+1 disks in each group. Although each group contains N+1 disks, each disk includes some blocks for storing data and some blocks for storing parity information. Where parity information is stored is controlled by an algorithm implemented by the user. As in RAID level 4 systems, RAID level 5 writes require access to at least two disks; however, no longer does every write to a group require access to the same dedicated parity disk, as in RAID level 4 systems. This feature provides the opportunity to perform concurrent write operations.

As with RAID level 3, parity data in either a RAID level 4 or 5 system can be calculated by performing a bit-wise exclusive-OR of corresponding portions of the data stored across the N data drives. However, because each parity bit is simply the exclusive-OR product of all the corresponding data bits from the data drives, new parity can be more easily determined from the old data and the old parity as well as the new data in accordance with the following equation:

new parity=(old data XOR new data) XOR old parity.

Although the parity calculation for RAID levels 4 or 5 shown in the above equation is much simpler than performing a bit-wise exclusive-OR of corresponding portions of the data stored across all of the data drives, a typical RAID level 4 or 5 write operation will require a minimum of two disk reads and two disk writes. More than two disk reads and writes are required for data write operations involving more than one data block. Each individual disk read operation involves a seek and rotation to the appropriate disk track and sector to be read. The seek time for all disks is therefore the maximum of the seek times of each disk. A RAID level 4 or 5 system thus carries a significant write penalty when compared with a single disk storage device or with RAID level 1, 2 or 3 systems.

In order to coordinate the operation of the disk drives within an array to perform read and write functions, map received data onto the array disk drive members, generate and check redundant information, and provide data restoration and reconstruction, complex storage management techniques are required. In many early disk array systems, the array management software necessary to perform these complex storage management techniques is executed within the host computer system. The host system thereby functions as the disk array controller and performs the generation and checking of redundant information as well as coordinating the many other storage management operations required of the disk array. Having the host perform these functions is expensive in host processing overhead.

Most disk array systems in use today are self-contained, including a dedicated controller for executing the array management software, thus relieving the host system of these operations. A simple architectural block diagram of a disk array system is shown in FIG. 1. The system includes an intelligent array controller 100 for managing the transfer of data between a host computer system 12 and N disk drive units, five of which, identified as DRIVE A through DRIVE E, are shown in FIG. 1. Central to the array controller is a high speed local bus 102, such as a Peripheral Component Interconnect (PCI). A host SCSI interface 104 and SCSI bus 14 provide connection between the host computer system 12 and PCI bus 102. Similarly, each of disk drives DRIVE A through DRIVE E are connected to PCI bus 102 through a SCSI drive interface, identified by reference numerals 112A through 112E, respectively, and corresponding SCSI buses 114A through 114E. Parity functions are performed by a parity logic circuit 108 and local memory 110, each also being connected with PCI bus 102. Communication between, and operation of, controller components are controlled by processor 106, in accordance with instructions residing in processor memory 118. The construction and operation of the array controller shown in FIG. 1, as well as the components included in the controller, should be readily understood by those skilled in the art.

The RAID storage process requires many parity calculations and data movement operations to create the necessary data redundancy, or reconstruct data following a disk failure. In the array controller architecture shown in FIG. 1 and described above, much use of PCI bus 102 is required to transfer new data, old data, reconstructed data, old parity information and new parity information between host computer system 12, array drives DRIVE A through DRIVE E, local memory 110 and parity logic 108 to generate new parity information during an array write operation or reconstruct data following an array failure.

OBJECTS OF THE INVENTION

It is therefore an object of the present invention to provide a new and useful a disk array controller hardware architecture that improves controller performance.

It is another object of the present invention to provide such a disk array controller architecture which allows concurrent data movements and parity calculations, and the concurrent execution of of time independent tasks.

It is yet another object of the present invention to provide such a disk array controller which includes unique parity assist logic and a dedicated local memory for performing parity generation and data reconstruction operations.

It is still a further object of the present invention to provide a new and useful disk array controller architecture which permits the simultaneous operation of data block moves between storage I/O devices and a local memory; data block moves between a host system and the local memory; parity calculations; and normal array controller processor memory fetches.

It is an additional object of the present invention to provide such a disk array controller architecture which also permits queued operation of block moves and queued operation for parity tasks.

SUMMARY OF THE INVENTION

There is provided, in accordance with the present invention, a disk array system for storing data received from, and providing stored data to, a host computer system. The disk array system includes a first high speed local bus; an interface circuit connecting the first high speed local bus with the host computer system; a plurality of disk drive members; at least one interface circuit connecting the plurality of disk drive members with the first high speed local bus; a parity assist logic circuit connected to the first high speed local bus; a local memory storage; a second high speed local bus connecting the parity assist logic with said local memory storage; and a processor connected to the first high speed local bus for controlling the operation of the components connected to said first high speed local bus. The parity assist logic provides data via the second high speed local bus to the local memory required for the calculation of parity data during disk array write operations, and manipulates the data saved to the local memory to determine parity during disk array write operations.

In the described embodiment, the parity assist logic includes a parity assist engine, including exclusive-OR logic, for calculating parity; a dual ported memory interface connecting said parity assist engine with said local memory via said second high speed local bus; and an interface circuit connecting said dual ported memory interface with said first high speed local bus. The first local bus is a high speed PCI buses. The second bus is a dual port memory interface.

The array controller architecture is scaleable and supports RAID modes 0, 3, 4 and 5. The architecture features a high bandwidth parity calculation engine and a buffered PCI interface operating at the full speed of the high speed PCI local bus. It features multiprocessing so that multiple tasks may be queued for execution. Additionally, it provides a way to attach blocks of up to 128 MBytes of additional local RAM memory to the PCI bus. The additional local memory is dual ported so that PCI and parity operations may operate concurrently.

The above and other objects, features, and advantages of the present invention will become apparent from the following description and the attached drawings.

DETAILED DESCRIPTION OF THE PREFERRED EMBODIMENT

Figure 1:
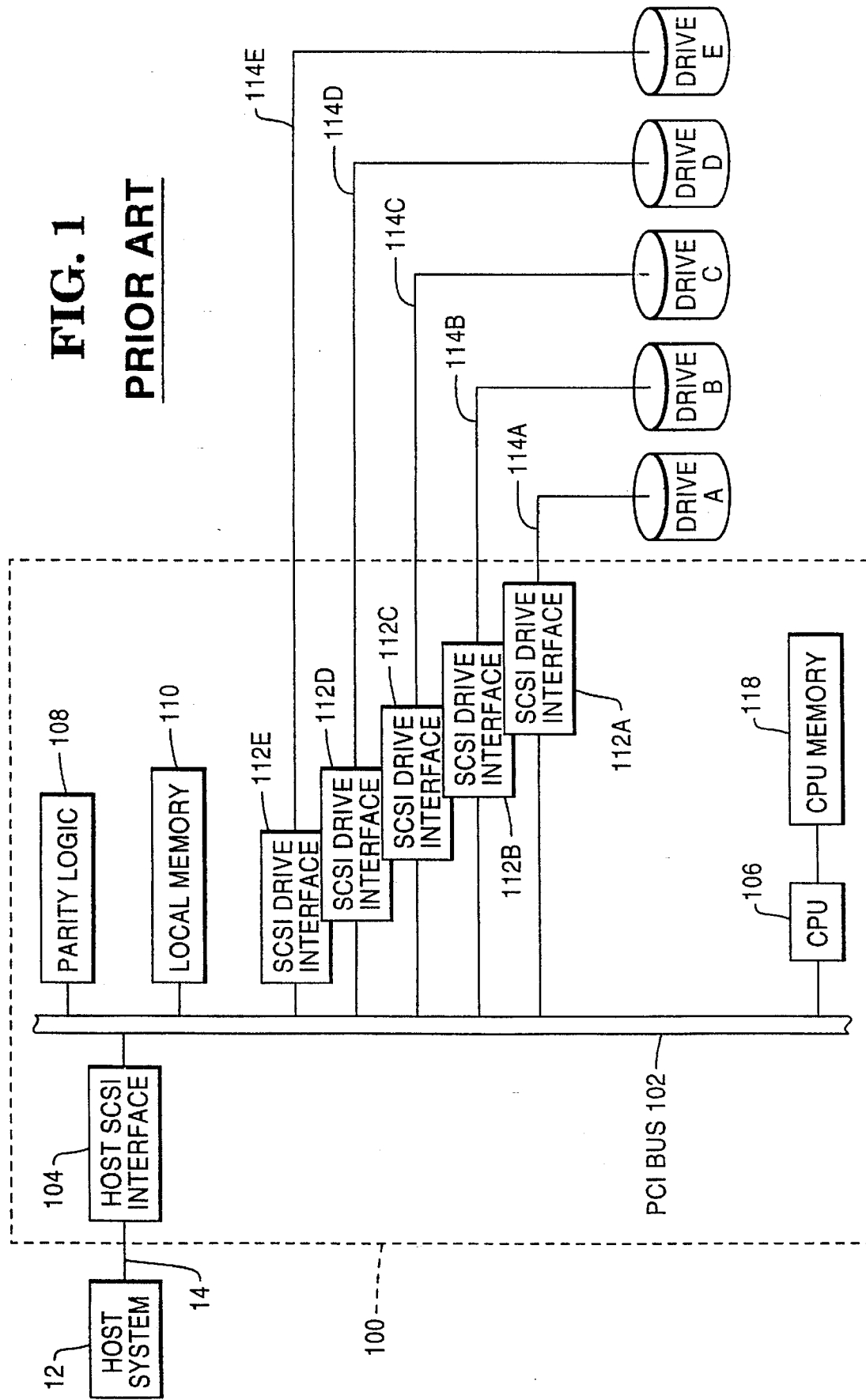
FIG. 1 is a simple architectural block diagram of a prior art disk array system utilizing a high speed PCI bus.
Figure 2:
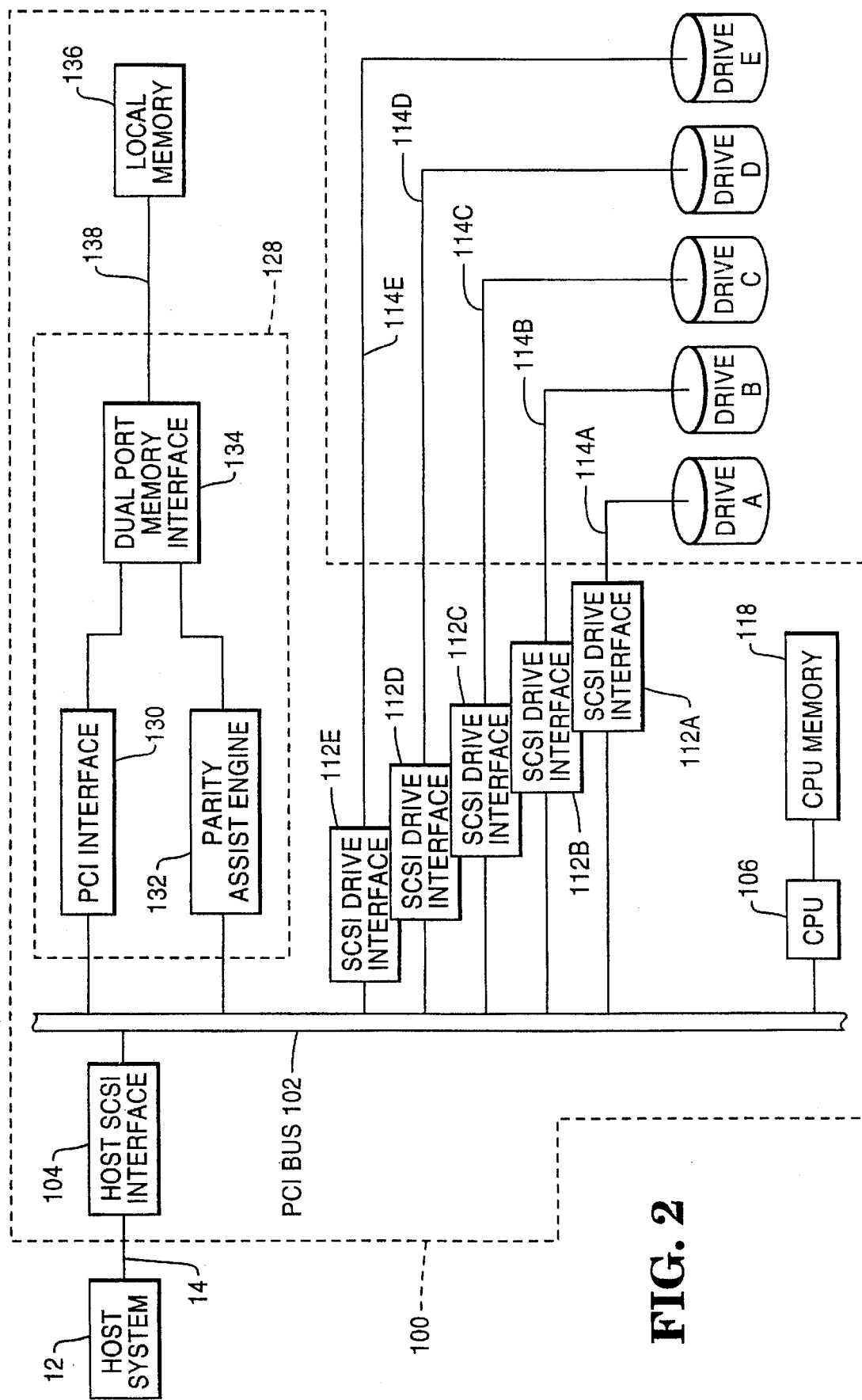
FIG. 2 is a simple block diagram of an improved disk array system utilizing a high speed PCI bus and a high performance parity function architecture in accordance with the present invention.

The disk array system shown in FIG. 2 includes many of the components shown in FIG. 1 and discussed earlier. For those components common to the controller architectures and array systems, the reference numerals of FIG. 1 have been retained in FIG. 2. Common components of the systems shown in FIGS. 1 and 2 include: high speed PCI bus 102, host SCSI interface 104, SCSI bus 14, SCSI drive interfaces 112A through 112E, SCSI buses 114A through 114E, disk drive members DRIVE A through DRIVE E, processor 106 and processor memory 118.

However, the array controller architecture shown in FIG. 2 improves upon previously known array controller architectures by removing the parity logic and the local memory utilized for parity generation and the reconstruction of data from PCI bus 102. The controller architecture shown in FIG. 2 provides an independent parity assist engine 132 and local memory 136 interconnected through a dual ported memory interface 134. A high speed PCI interface 130 provides for the transmission of data between PCI bus 102 and local memory 136.

PCI bus interface 130, parity calculation engine 132, and dual ported memory interface 134 are shown integrated together into a single RAID parity assist chip 128. However, these three components operate independently, in a coordinated manner, to provide high speed data storage and parity calculations while using a minimum of host CPU cycles. A high speed local bus 138 connects the RAID parity assist chip with local memory 136.

During a disk write operation, data blocks are received from the host SCSI channel 14 and stored in local memory 136. The parity assist engine 132 reads the data, calculates the parity information and writes it back to local memory 136. The final data blocks are then written to the appropriate disk drives from local memory 136.

Disk read operations start with data moved from the disk drives to local memory 136. This data is then transferred to the host SCSI channel 14 unless the parity information is needed to reconstruct the data.

Since this architecture is very memory intensive, local memory 136 is organized for high bandwidth with a 72 bit wide interface. It also supports interleaved cycles for maximum performance. The memory system is capable of operating at the full clock speed of the RAID parity assist chip. Refresh control is also included so that economical dynamic RAM can be used for storage. A powered down mode of operation is provided to protect the memory data if power fails.

The PCI interface module 130 is capable of full speed PCI bus transfers. It is designed to respond to all bus modes from single byte to full bandwidth bursts. The PCI module contains a 128 byte FIFO to store data accepted from the PCI bus. This allows the PCI transfer to continue even if local memory is temporarily unavailable.

The parity assist engine 132 operates on data stored in local memory 136. It calculates parity a burst at a time utilizing a 128 byte FIFO to store the intermediate results. The intermediate results are not written back to local memory. For maximum performance the control logic for the parity assist engine maintains pointers to each needed data block. The parity engine operates at the full speed of the local memory bus to provide the fastest possible performance for the memory bandwidth.

The parity assist engine contains 4 separate sections that allow additional tasks to be queued up while one task executes. Each task maintains its own control and status register so that task scheduling does not interfere with the currently executing task. Several configuration options are provided to tailor the parity engine to the array organization. The engine can be configured as a single engine which works on wide arrays up to 22+1 drives wide, or as a four engine machine which operates with arrays as wide as 4+1 drives. An intermediate mode provides a two engine machine with up to 10+1 drives.

The parity engine includes exclusive-OR logic providing RAID 5 and RAID 3 parity generation/checking as well as move and zero check modes.

One of the most important parts of the architecture is the time independent operation it provides. Blocks of data are not required to be accessed simultaneously for parity calculations. Disk operations which span several drives may be scheduled and executed as soon as possible by each device. Unrelated disk operations may continue even though all drive operations for a single task are not yet complete. This independence improves the performance of the slowest part of the system, the disk drive. It also simplifies the software task of managing concurrent hardware resource requirements.

The invention features time independent data block moves; time independent parity calculations; queued RAID operations (Up to 3 queued tasks); full speed PCI transfer operations (4 bytes/clock cycle); and full speed parity calculations (4 bytes/clock cycle). Furthermore, the architecture is scaleable via the addition of additional RAID Parity Assist chips and local memory storage.

It can thus be seen that there has been provided by the present invention a disk array controller architecture having an independent memory structure for buffering data, and an independent parity calculation engine permitting parallel operation of array tasks. It allows parity calculations and memory block moves to occur without interfering with the CPU or its memory, freeing the CPU to manage array task control. The disclosed array controller configuration allows simultaneous operation of data block moves between storage I/O devices and local memory; data block moves between host SCSI connections and local memory; parity calculations; and normal CPU memory fetches, queued operations for block moves and queued operations for parity tasks.

Although the presently preferred embodiment of the invention has been described, it will be understood that various changes may be made within the scope of the appended claims.

What is claimed is:

1. A disk array system for storing data received from, and providing stored data to, a host computer system; said disk array system comprising:

a first high speed local bus;

a first interface circuit connecting said first high speed local bus with said host computer system;

a plurality of disk drive members;

second interface circuit means connecting said plurality of disk drive members with said first high speed local bus;

a parity assist logic circuit connected to said first high speed local bus;

a local memory storage connected to said first high speed local bus;

a second high speed local bus connecting said parity assist logic circuit with said local memory storage;

wherein said parity assist logic circuit provides data via said second high speed local bus to said local memory storage required for calculation of parity data during disk array write operations, and wherein said parity assist logic circuit manipulates the data saved to said local memory storage via said second high speed local bus to determine parity during said disk array write operations; and a processor connected to said first high speed local bus for controlling operation of said first interface circuit and said second interface circuit and said parity assist logic circuit via said first high speed local bus independent of said second high speed local bus, wherein said processor is simultaneously operable with said parity assist logic circuit.

2. The disk array system in accordance with claim 1, wherein said parity assist logic circuit comprises:

a parity assist engine for calculating parity;

a dual ported memory interface connecting said parity assist engine with said local memory storage via said second high speed local bus; and a third interface circuit connecting said dual ported memory interface with said first high speed local bus.

3. The disk array system in accordance with claim 2, wherein said parity assist engine comprises an exclusive-OR circuit.

4. A disk array controller for a disk array system including a plurality of disk drive members for storing data received from, and providing stored data to, a host computer system; said disk array controller comprising:

a first high speed local bus;

a first interface circuit connecting said first high speed local bus with said host computer system;

second interface circuit means connecting said plurality of disk drive members with said first high speed local bus;

a parity assist logic circuit connected to said first high speed local bus;

a local memory storage connected to said first high speed local bus;

a second high speed local bus connecting said parity assist logic circuit with said local memory storage;

wherein said parity assist logic circuit provides data via said second high speed local bus to said local memory storage required for calculation of parity data during disk array write operations, and wherein said parity assist logic circuit manipulates the data saved to said local memory storage via said second high speed local bus to determine parity during said disk array write operations; and a processor connected to said first high speed local bus for controlling operation of said first interface circuit and said second interface circuit and said parity assist logic circuit via said first high speed local bus independent of said second high speed local bus, wherein said processor is simultaneously operable with said parity assist logic circuit.

5. The disk array controller in accordance with claim 4, wherein said parity assist logic circuit comprises:

a parity assist engine for calculating parity;

a dual ported memory interface connecting said parity assist engine with said local memory storage via said second high speed local bus; and a third interface circuit connecting said dual ported memory interface with said first high speed local bus.

6. The disk array controller in accordance with claim 5, wherein said parity assist engine comprises an exclusive-OR circuit.

7. In a disk array system including a first high speed local bus; a first interface circuit connecting said first high speed local bus with a host computer system; a plurality of disk drive members; second interface circuit means connecting said plurality of disk drive members with said first high speed local bus; and a processor connected to said first high speed local bus for controlling operation of said first interface circuit and said second interface circuit and said parity assist logic circuit via said first high speed local bus; the improvement comprising:

a parity assist logic circuit connected to said first high speed local bus;

a local memory storage connected to said first high speed local bus; and a second high speed local bus connecting said parity assist logic circuit with said local memory storage independent of said first high speed local bus; wherein said parity assist logic circuit is simultaneously operable with said processor provides data via said second high speed local bus to said local memory storage required for calculation of parity data during disk array write operations, and wherein said parity assist logic circuit manipulates the data saved to said local memory storage via said second high speed local bus to determine parity during said disk array write operations.

8. The improvement in accordance with claim 7, wherein said parity assist logic circuit comprises:

a parity assist engine for calculating parity;

a dual ported memory interface connecting said parity assist engine with said local memory storage via said second high speed local bus; and a third interface circuit connecting said dual ported memory interface with said first high speed local bus.

9. The improvement in accordance with claim 8, wherein said parity assist engine comprises an exclusive-OR circuit.

* * * * *